United States Patent [19]

Tanaka et al.

[11] 4,265,320

[45] May 5, 1981

[54] ELECTRICALLY POWERED TORQUE-CONTROLLED TOOL

[75] Inventors: Tamotsu Tanaka; Michio Kato, both of Hirakata; Masataka Uematsu, Katano; Yoshikazu Nishida, Hirakata; Shuji Hosokawa, Habikino, all of Japan

[73] Assignee: Matsushita Electric Industrial Co., Ltd., Osaka, Japan

[21] Appl. No.: 902,867

[22] Filed: May 4, 1978

[30] Foreign Application Priority Data

May 16, 1977 [JP] Japan ................................ 52/56960
Nov. 1, 1977 [JP] Japan ................................ 52/131723

[51] Int. Cl.[3] ........................................ B23Q 5/027

[52] U.S. Cl. .................................. 173/12; 192/0.034; 192/150

[58] Field of Search ............... 173/12, 117; 192/56 R, 192/150, 0.034, 34; 310/50, 62; 64/29 R, 30 R; 81/52.4 R, 52.4 A

[56] References Cited

U.S. PATENT DOCUMENTS

| | | | |
|---|---|---|---|
| 2,775,137 | 12/1956 | Chung | 192/150 X |
| 2,886,075 | 5/1959 | Skoog | 192/56 R X |
| 3,020,789 | 2/1962 | Etzkorn | 81/52.4 |
| 3,034,623 | 5/1962 | Amtsberg | 192/56 R |
| 3,059,620 | 10/1962 | Eckman | 173/12 |
| 3,121,813 | 2/1964 | Pratt et al. | 310/50 |
| 3,205,992 | 9/1965 | Clapp | 192/150 |
| 3,331,452 | 7/1967 | Wanner | 173/117 X |
| 3,419,087 | 12/1968 | Amtsberg et al. | 173/12 |
| 3,420,250 | 1/1969 | Holmes | 310/50 X |
| 3,442,360 | 5/1969 | Fulop | 64/29 |
| 3,477,521 | 11/1969 | Kiester et al. | 173/12 |
| 3,585,427 | 6/1971 | Paule | 310/50 |
| 3,873,863 | 3/1975 | Pew | 173/163 X |
| 4,049,104 | 9/1977 | Webb | 173/12 X |
| 4,078,618 | 3/1978 | De Pagter et al. | 173/12 |

*Primary Examiner*—Lawrence J. Staab
*Attorney, Agent, or Firm*—Joseph W. Farley

[57] ABSTRACT

An electrically powered torque-controlled tool having an electric motor which rotates a bit, whereby a screw, bolt or nut fitted at the front end of the bit is tightened. The tool is designed so that when the tightening force exerted by the bit reaches a preset torque, the driving by the electric motor is stopped by opening the switch and concurrently therewith a clutch interposed between the electric motor and the bit is disengaged and held in this released state, thereby avoiding the reaction which would otherwise be produced by the motor inertia immediately after the tightening, thus achieving a high-precision tightening operation.

7 Claims, 9 Drawing Figures

ELECTRICALLY POWERED TORQUE-CONTROLLED TOOL

Figure 1:
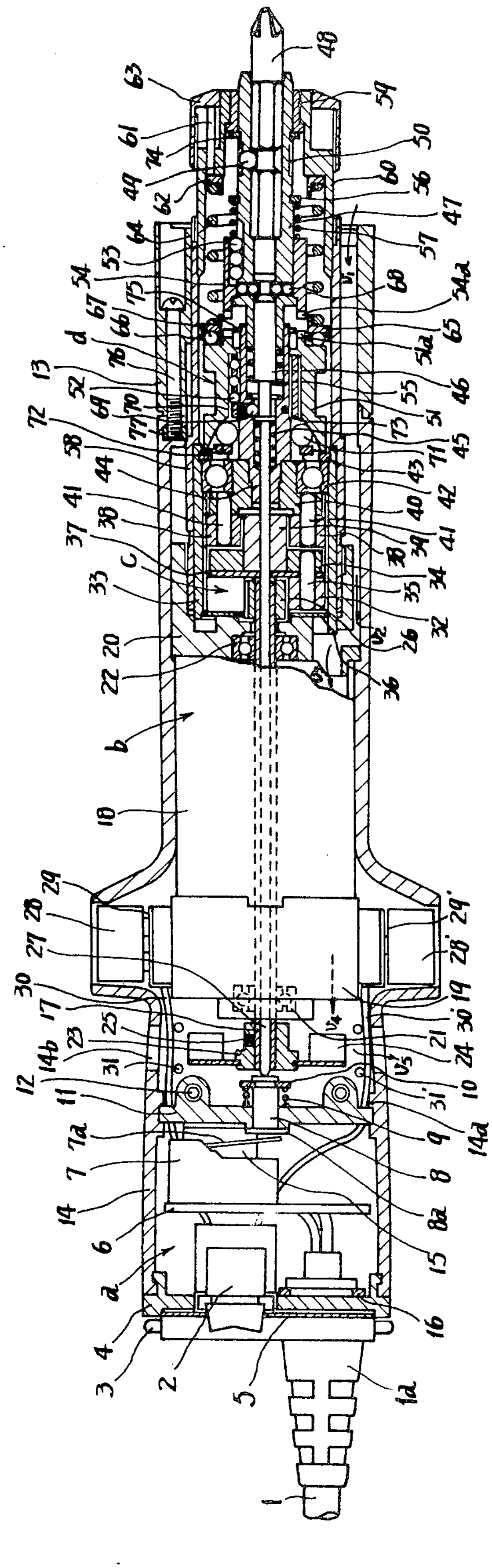

The present invention relates to an electrically powered torque-controlled tool used, for example, for tightening threaded parts, such as bolts and nuts with the proper torque to avoid the deterioration of products due to excessive or deficient tightening and make it easier for the tightening worker to control torque, thereby improving the efficiency of operation in assembling various parts and products. More particularly, the invention relates to an electrically powered torque-controlled tool which employs an electric motor as a drive source so that it can be easily used even in terminal factories where there is no air equipment, said tool being free from factors undesirable to working environment, such as noise and vibration.

Further, the invention may be utilized as a safety device in connection with other electrically powered rotatory tools in order to stop the electric motor when a preset torque is attained.

Recently, in electrically powered torque-controlled tools, especially electrically powered screw drivers, there has been an increasing demand for driving screws into synthetic resin products which require tightening-torque control, and in conjunction therewith electrically powered screw drivers which are electrically controlled have come to be spotlighted, but such prior art electrically powered screw drivers are designed merely to stop the electric motor, with the result that it has been impossible to avoid the reaction to the worker's hands produced upon the stoppage of the motor. In the case of a high-torque screw tightening operation, therefore, the reaction to the worker is so high as to cause fatigue to his hands and shoulders. Further, in order to effect high-torque tightening by using an electrically powered screw driver, it has been necessary to drastically reduce the r.p.m. the bit so as to increase the motor torque, resulting in a poor efficiency of operation. Thus, electrically powered tightening tools, which have the merit that the A.C. power source which is available even in homes can be used, are confronted with various problems, as described above.

Further, in conventional pneumatic screw drivers having a torque cut-off mechanism adapted to be actuated by a predetermined torque, the difficulty of fine operation of the shut-off valve causes the air motor to be re-started at the time of the resetting operation subsequent to tightening. Also in such drivers, a variation in the air pressure increases or decreases the torque of the air motor, thus influencing the tightening torque. In a further arrangement having an exhaust hose installed therein, there is yet much noise and vibration produced during the tightening operation, which has come to be limelighted as an important problem in the present day when improvements in the assembling environment are clamored for.

In order to eliminate the drawbacks inherent in the prior art as described above, the present invention has for its object the provision of an electrically powered torque-controlled tool designed to stop the electric motor by the action of a torque cut-off mechanism adapted to be positively moved when the screw-tightening torque reaches a fixed value, thereby greatly reducing the noise and vibration which have been considered to be the fatal drawbacks to conventional pneumatic screw drivers, avoiding the reaction produced by the inertia moment of the motor armature immediately after the tightening operation, and maintaining the r.p.m. of the bit at a constant value even in a high-torque tightening operation, thereby making it possible to achieve a high efficiency of screw tightening operation.

It is also an object of the invention to provide an electrically powered torque-controlled tool which achieves a high-precision tightening torque by the use of a clutch adapted to be acted upon by the aforesaid torque cut-off mechanism and which is capable of fully meeting the recent increasing demand for torque control.

It is a further object of the invention to provide an electrically powered torque-controlled tool which is adapted to stop the electric motor immediately after fixed-torque tightening, as described above, so that the tool is prevented from causing occupational diseases, such as tenosynovitis, which has been recently at issue, and wherein the electric motor may be rotated only when necessary, thus reducing the noise and, more than anything else, making it possible to prolong the life of the electric motor, especially the brushes.

In order to achieve the above objects, the invention provides an electrically powered torque-controlled tool comprising an electric motor serving as a drive source, a switch for starting and stopping said electric motor, a clutch installed between said electric motor and a bit so as to permit interruption and continuation of the transmission of rotation between the both, a torque cut-off mechanism adapted to act on said clutch when the torque by the bit reaches a preset torque to thereby cut off the driving force from the electric motor to the bit, a lock mechanism for holding said clutch in its disengaged state at the cut-off time, and a switch operating mechanism adapted to transmit the action of said torque cut-off mechanism to said switch.

Figures 2A, 2B, 2C:
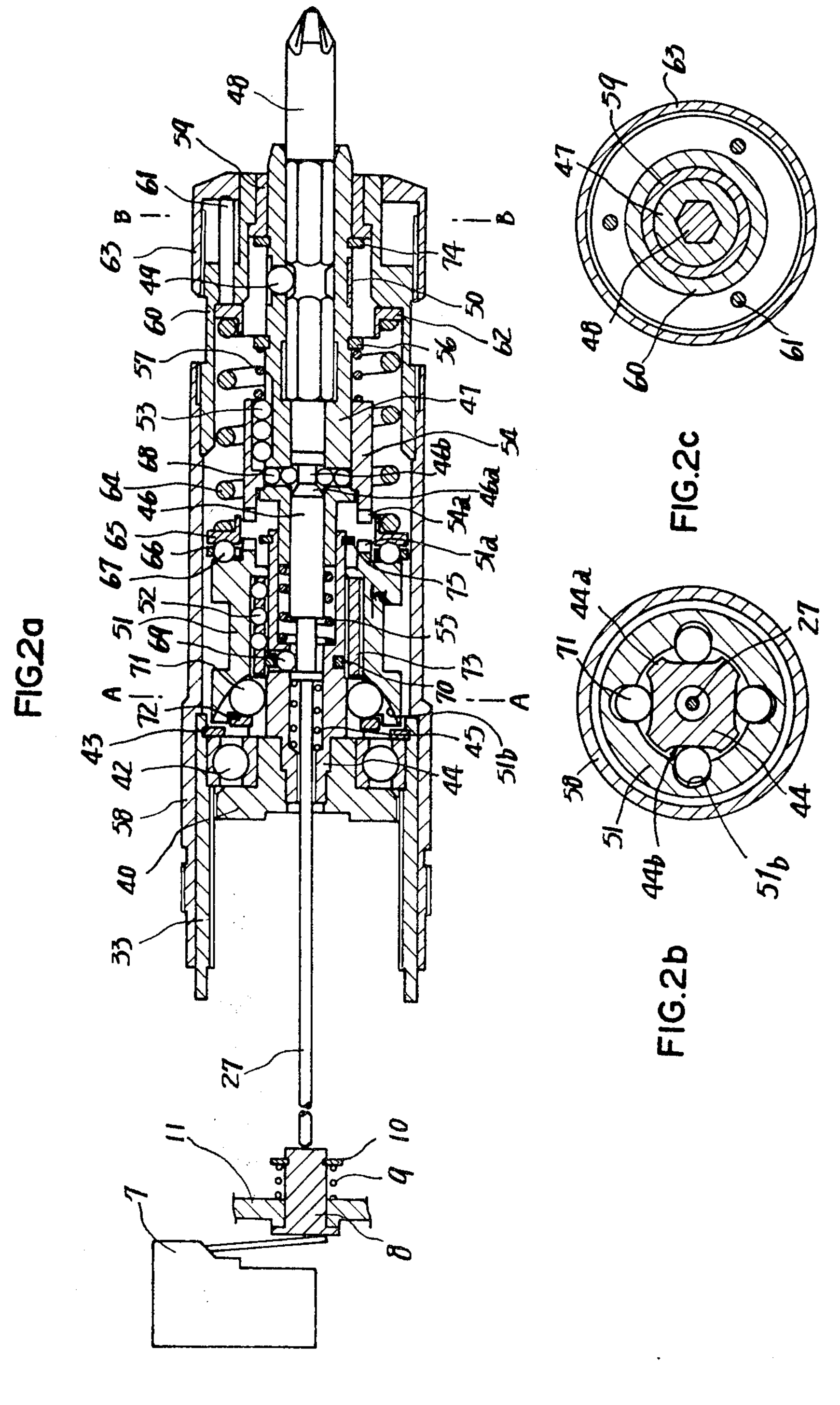
Figure 4A:
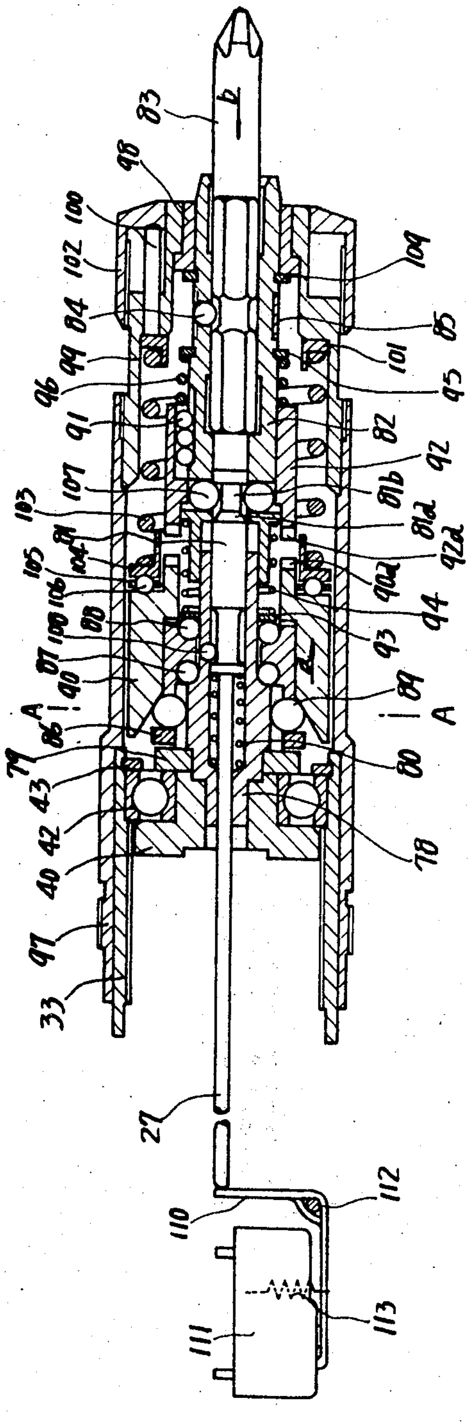
Figure 4B:
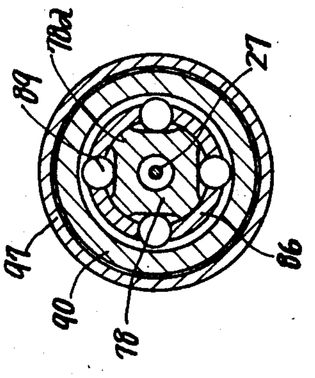

These and other objects and merits of the present invention will be readily understood from the following description of preferred embodiments of the invention which will be given with reference to the accompanying drawings, in which:

FIG. 1 is a longitudinal section of an electrically powered torque-controlled driver according to an embodiment of the invention;

FIG. **2*a*** is a sectional view showing a clutch unit and a limit switch included in said electrically powered torque-controlled driver;

FIG. **2*b* is a sectional view taken along the line A—A of FIG. 2*a***;

FIG. **2*c* is a sectional view taken along the line B—B of FIG. 2*a***;

FIGS. **3*a*, 3*b* and 3*c*** are sectional views of principal portions showing the operating state of the clutch unit and limit switch;

FIG. **4*a* is a sectional view showing another embodiment of clutch unit and a limit switch; and FIG. 4*b* is a sectional view taken along the line A—A of FIG. 4*a***.

First, referring to FIG. 1, which is an entire view, the character a designates a power source unit; b designates a driving unit; c designates a speed-reducing unit; and d designates a clutch unit.

In the power source unit a, the numeral 1 designates a driver cord having an ac power source receptable cap (not shown) fixed to the front end thereof. The numeral 2 designates a switch used for turning on and off the power and also for switching between forward and reverse rotations; and 3 designates hangers fixed to a top cover 4. The numeral 6 designates a print board on which circuit parts which are the heart of the power source unit a are placed, with a limit switch 7 fixed thereto. The numeral 8 designates a stepped pin for actuating the limit switch; and 9 designates a spring installed between a ring 10 fitted on the stepped pin 9 and a partition plate 11, said spring 9 abutting the flange portion 8*a* of the stepped pin 8 against the partition plate 11, while the lever 7*a* of the limit switch 7 abutting against the head of the flange portion 8*a* of the stepped pin 8. The numeral 12 designates screws for fixing a split sheathing case 14 for clamping the top cover 4 and front end cover 13 and covering the entire tool. The case 14 has its outer surface shape formed with two symmetrical curved surfaces and has a slope gradually thickening from the electric motor covering portion to the front end. The character 14*a* designates a rib on the case 14 for fixing the partition plate 11 in position; 15 designates a bracket secured to the partition plate 11 and to the limit switch soldered to the print board 6; and 16 designates a ring for preventing the slipping-off of the protector bushing 1*a* of the driver cord 1.

In the driving unit b, the numeral 17 designates a motor shaft supported in ball bearings 21 and 22 which are respectively fitted in a bracket 19 fitted to a motor case 18 and another bracket 20 of an electrically non-conductive material. A fan 24 is fixed through a fan boss 23 by a screw 25 to the portion of the motor shaft projecting toward the power source unit a, while a first sun gear 26 is adhesively fixed to the end of said motor shaft projecting toward the speed-reducing unit c. The motor shaft 17 is tubular, having a through-hole at the center, and received in said through-hole is a switch rod 27 whose head abuts against the end surface of the aforesaid stepped pin 8 and which extends to the clutch unit d.

The characters 28 and 28' designate nuts for holding down electrically conductive rings 29 and 29'; and 30 and 30' designate lead wires extending from the switch 2 to the motor and connected to the electrically conductive rings 29 and 29'. Designates at 31 and 31' are lead wire guide pins projecting from the case 14.

The character 14*b* designates holes provided in the case 14 for dissipating the generated heat of the driving unit b by the fan 24, it being noted that the partition plate 11 serves to shut off the hot air being driven out by the fan 24 that it may not influence the power source unit a.

In the speed-reducing unit c, the character 32 designates first planet gears of an electrically non-conductive material meshing with the first sun gear 26 and an internal gear 33, said planet gears rotating around the axes of their respective pins 35 press-fitted into a first speed-reduction shaft 34, said planet gears also revolving around the first sun gear 26, thereby executing a planetary motion. The numeral 36 designates a spacer of an electrically non-conductive material inserted between the bracket 20 and internal gear 33; and 37 designates a spacer of an electrically non-conductive material inserted between the first planet gears 32 and first speed-reduction shaft. The numeral 38 designates second planet gears meshing with s second sun gear 39 press-fitted on the first speed-reduction shaft 34 and with the internal gear 33 and rotating around the axes of respective pins 41 press-fitted into a second speed-reduction shaft 40. The numeral 42 designates a ball bearing fitted in the internal gear 33 and retained by a ring 43, said second speed-reduction shaft 40 being fitted in the inner race of said ball bearing 42. The internal gear 33 is fitted in the bracket 20 so as not to be circumferentially rotated.

In FIGS. 1 and 2*a* showing the clutch unit d, the numeral 44 designates a clutch shaft, which is fitted in the second speed-reduction shaft 40 and arranged so that the driving force may be transmitted by the front end flat portion of the clutch shaft 44. The numeral 45 designates a lock spring interposed between a lock cam 46 and the clutch shaft 44; 47 designates a bit holder fitted in the clutch shaft 44 and holding a bit 48 by means of a ball 49 and an elastic band 50; and 51 designates a hammer ring which is axially slidably and rotatably fitted on the clutch shaft 44 through a number of balls 52 and has square teeth 51*a* at one end thereof, said teeth 51*a* being adapted to engage square teeth 54*a* on one end of a clutch claw receiver 54 which is fitted on the bit holder 47 so as to be slidable axially thereof but prevented by balls 53 from being rotated relative thereto. A return spring 55 is interposed between the bit holder 47 and the clutch shaft 44, while a reset spring 57 is interposed between the clutch claw receiver 54 and a ring 56 fitted on the bit holder 47.

A clutch case 58 fitted on the internal gear 33 and screwed into the bracket 20 has coaxially screwed thereinto a cap 60 which has a bushing 59 press-fitted thereinto, with pins 61 slidably inserted in said cap 60. One of the respective ends of the pins 61 abuts against a ring 62 and the other ends against an adjusting nut 63. A torque spring 64 is interposed between the hammer ring 51 and the ring 62 through the intermediary of a spring seat 65 and balls 67 retained by a ball retaining plate 66. The numeral 68 designates lock balls disposed between the lock cam 46 and the clutch claw receiver 54; 69 designates a stop ball for the lock cam; and 70 designates a holder ring for the stop ball 69. The numeral 71 designates balls interposed between the clutch shaft 44 and grooves 51*b* in the hammer ring 51 and abutting against a ring 72 fitted on the clutch shaft 44. The numeral 73 designates a retainer for a number of balls 52 interposed between the clutch shaft 44 and the hammer ring 51.

The relation between the clutch shaft 44, balls 71 and hammer ring 51 is as shown in FIG. 2*b* and is such that when the clutch shaft 44 and the hammer ring execute a relative rotary motion the ridges 44*a* of the clutch shaft 44 radially outwardly push the balls 71 which, in turn, depress the hammer ring 51 in the direction of arrow a. The numeral 74 designates a ring fitted on the bit holder 47 and adapted to abut against the end surface of the bushing 59 at the time of stoppage. The numeral 75 designates a ring fitted on the clutch shaft 44; 76 designates screws whereby the sheathing case 14 and the front end cover 13 are put together; and 77 designates nuts therefor.

In the above arrangement, the operation will now be described.

In FIG. 1, the A.C. current supplied through the driver cord 1 is passed through the limit switch 7 and then rectified by the circuit on the print board inside the power source unit a, whereupon it is passed through the switch 2 and then through the lead wires 30 and 30' to be supplied to the driving unit b. Thereupon, the electric motor starts rotating to transmit the torque to the speed-reduction unit c. Concurrently therewith, the fan 24 is rotated to draw the open air along a path indicated by arrows $v_1$, $v_2$ and $V_3$, said air then flowing along a path indicated by arrows $v_4$ and $v_5$ inside the motor to force the hot air into the atmosphere.

As the first sun gear 26 starts rotating, the first planet gears 32 rotatably attached to the first speed-reduction shaft 34 by the pins 35 execute a planetary motion around the first sun gear 26 while meshing with the teeth of the internal gear 33, so that the rotation of the first speed-reduction shaft 34 is what results from the rotation of the motor shaft 17 being reduced in speed. Further, the second planet gears 38 rotatably attached to the second speed-reduction shaft 40 by the pins 41 execute a planetary motion around the second sun gear 39, which is press-fitted on the first speed-reduction shaft 34 and is coaxial with the first speed-reduction shaft 34, while meshing with the teeth of the internal gear 33, so that the rotation of the second speed-reduction shaft 40 is what results from the rotation of the first speed-reduction shaft 34 being reduced in speed. As a result, the rotation of the motor shaft 17 is reduced in speed twice and taken out by the second speed-reduction shaft 40.

In this connection, it is to be noted that in order to isolate the speed-reducing section from the driving unit b, the internal gear 33 is coaxially fitted in the bracket 20 of an electrically non-conductive material, that the first planet gears 32 revolving around the first sun gear 26 adhesively fixed to the motor shaft 17 is also made of an electrically non-conductive material, and that the spacer 37 of an electrically non-conductive material is interposed between the end surface of the first sun gear 26 and the first speed-reduction shaft 34. Further, the switch rod 27 is also made of an electrically non-conductive material, whereby the speed-reduction unit c and the clutch unit d are isolated.

The first speed-reduction unit constituted by the first planet gears 32, pins 35, spacer 37, first speed-reduction shaft 34 and second sun gear 39 has the spacer 36 interposed between itself and the bracket 20 to reduce sliding friction produced by the relative speed and cause said first speed-reduction unit to float. Further, profile shifting is applied to the first planet gears 32, first sun gear 26 and internal gear 33 and to the second sun gear 39 and second planet gears 38 so as to assure the proper meshing of their teeth or the backlash has been adjusted so as to have an optimum value. Therefore, the first speed-reduction unit will smoothly execute a rotary motion while playing a self-aligning role.

The motor shaft 17 is reduced in speed in two stages, and the torque of the driving unit b is transmitted from the second speed-reduction shaft 40 to the clutch unit d. However, in a state where the bit 48 is not yet pressed as before it drives a screw, as shown in FIG. *2a*, the limit switch 7 is not in a position to allow electric current to pass therethrough, so that the motor does not rotate. When the bit 48 is pressed in the direction of arrow b in order to drive a screw, as shown in FIG. *3a*, the bit holder 47 is backwardly moved against the force of the return spring 55, causing the lock ball 68 to abut against the slope 46*a* of the lock cam 46 to backwardly move the latter against the force of the lock spring 45, depressing the switch rod 27 to backwardly move the stepped pin 8 against the force of the spring 9, thereby actuating the limit switch 7. As a result, the electric motor starts rotating, so that a torque which is decelerated and strengthened by the action of the speed-reducing unit c is transmitted to the clutch shaft 44 and the hammer ring 51 starts rotating through the intermediary of the balls 71. Concurrently therewith, under the action of the resilient force of the reset spring 57 the teeth 54*a* of the clutch claw receiver 54 backwardly moving integrally with the bit holder 47 engage the teeth 51*a* of said hammer ring 51, thus starting to rotate the bit holder 47 through the intermediary of the clutch claw receiver 54 and balls 53, so that the screw (not shown) which is engaged with the bit 48 starts to be screwed. The movement of the bit holder 47 in the direction of arrow b is stopped when its rear step surface abuts against the front end surface of the clutch shaft 44, but the construction is such that the thrust load acting in the direction of arrow b is applied to the inner race of the ball bearing 42 by the clutch shaft 44 so that it does not influence the second speed-reduction shaft 40 at all.

When the screw has been tightened up, as shown in FIG. *3b*, the ridges 44*a* of the clutch shaft 44 radially outwardly push the balls 71, depressing the hammer ring 51 in the direction of arrow a against the force of the torque spring 64. Concurrently therewith, the clutch claw receiver 54 is also moved against the force of the reset spring 57 until the hollow portion 54*b* of the clutch claw receiver 54 is positioned above the lock balls 68. With this state established, the lock cam 46 urged by the lock spring 45 pushes up the lock balls 68 by its slope 46 to fit them into said hollow portion 54*b*. As soon as this ball fitting takes place, the switch spring 9 pushes back the switch rod 27, as shown in FIG. *3c*, thereby cutting off the current flowing to the motor.

Concurrently therewith, the hammer ring 51, under the action of the torque spring 64, drops the balls 71 onto the flats 44*b* of the clutch shaft 44 and returns to its original position. Therefore, the teeth 51*a* and 54*b* are disengaged from each other, so that the driving force is completely cut off. As a result, there is no reaction to the worker's hands due to the inertia moment of the motor armature (not shown) when the motor is stopped, i.e., when the screw has been tightened up, and very little noise is produced.

When the bit is pushed back from the state of FIG. *3c* in the direction of arrow d by the resilient force of the return spring 55, the lock balls 68 are positioned above the valley 46*b* of the lock cam 46, and with this state established, the lock balls 68 can be easily dropped thereinto by the resilient force of the reset spring 57, so that the state prior to screwing, i.e., the state of FIG. *2a* is restored.

The balls 67 serve to reduce the friction produced by the relative movement of the hammer ring 51 and torque spring 64. The adjustment of the tightening torque can be made by tightening the adjusting nut 63, causing the pins 61 to move the ring 62 to compress the torque spring 64, thereby increasing the resilient force.

In FIGS. *4a* and *4b* showing another embodiment of the clutch unit c, the numeral 78 designates a clutch shaft fitted in a second speed-reduction shaft 40 and adapted to transmit the driving force by its front end flat portion. The numeral 79 designates a ring for transmitting the thrust on the clutch shaft 78 to the inner race of a ball bearing 42. The numeral 80 designates a lock spring interposed between a lock cam 81 and the clutch shaft 78; 82 designates a bit holder fitted on the clutch shaft 78 and serving to hold a bit by means of a ball 84 and an elastic band 85; 86 designates a ball holder rotatably fitted on the clutch shaft 78 through balls 87 and 88 for retaining balls 89; and 90 designates a hammer ring which is fitted on the ball holder 86 so that it is slidable but not rotatable relative thereto, and which has square teeth 90*a* on one end thereof. The teeth 90*a* are adapted to engage square teeth 92*a* on one end of a clutch claw receiver 92 which is fitted on the bit holder 82 so as to be slidable axially thereof but prevented by balls 91 from being rotated relative thereto. A return spring 94 is interposed between the bit holder 82 and the ball holder 86 through the intermediary of balls 88 and a ring 93, while a reset spring 96 is interposed between the clutch claw receiver 92 and a ring 95 fitted on the bit holder 82.

The relation between the clutch shaft 78, the balls 89 and the ball holder 86 is as shown in FIG. 4*b* and is such that when the clutch shaft 78 and the ball holder 86 execute a relative rotary motion, the ridges 78*a* of the clutch shaft 78 radially outwardly push out the balls 89 which, in turn, depress the hammer ring 90 in the direction of arrow a.

The numeral 110 designates a lever for actuating a limit switch 111; 112 designates a pin serving as an axis around which the lever 111 is turned; and 113 designates a spring for urging the lever toward the limit switch 111.

Figure 3A:
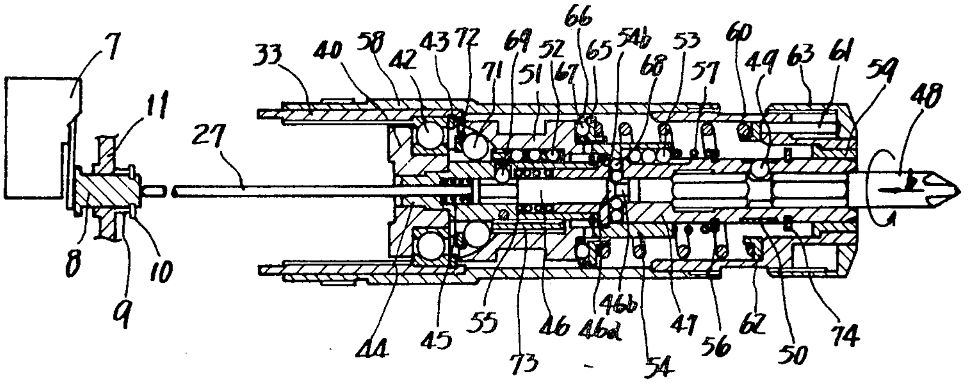
Figure 3B:
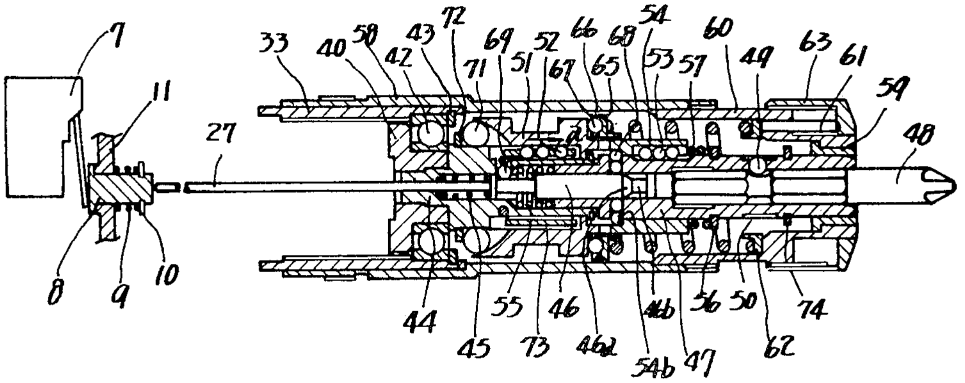
Figure 3C:
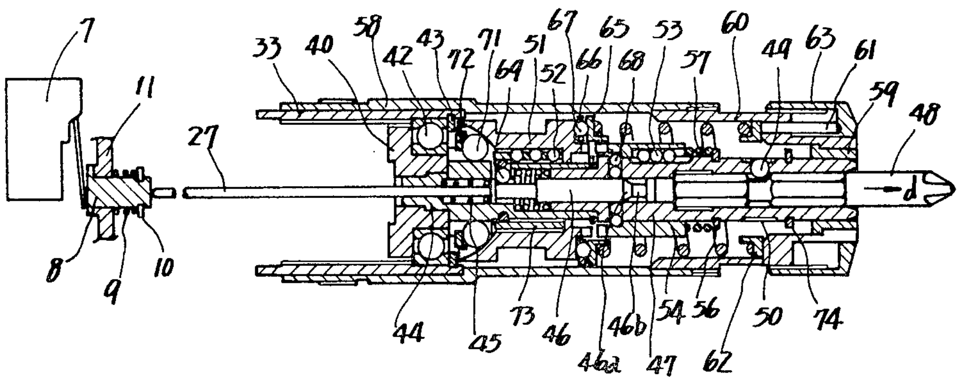

The function of the clutch unit shown in FIGS. 4*a* and 4*b* differs from that of the clutch unit in the first embodiment shown in FIGS. 1 through 3 in that when the bit holder attains a preset torque, the clutch shaft 78 and ball holder 86 execute a relative rotary motion and the hammer ring 90 rotation-wise coupled with the ball holder 86 is rotated integrally with the ball holder 86 and at the same time is moved axially of the ball holder 86, and that the direction of actuation of the limit switch 111 is reversed. The rest of the function is the same.

In the above arrangement, since the power source unit a, driving unit b, speed-reducing unit c and clutch unit d are prepared as individual units, it is possible to perform screw tightening operations efficiently and properly by preparing several kinds of each unit and changing the combination of units a–d according to the type of the screw to be tightened and the tightening torque. Further, if this electrically powered torque-controlled tool is used with an automatic screw feeding apparatus, the efficiency will be much higher.

As has been described so far, the electrically powered torque-controlled tool according to the embodiments is designed so that the motor is rotated by the pressing action of the tool exerted when the worker tightens the screw or nut, while the electric motor is stopped by the action of the torque cut-off mechanism adapted to be positively moved when the screw tightening torque reaches a fixed value, thereby greatly reducing the noise and vibration which have been considered to be the fatal drawbacks to conventional pneumatic drivers, avoiding the reaction which would otherwise be produced by the inertia moment of the motor armature immediately after the tightening operation, and maintaining the r.p.m. of the bit at a constant value even in a high-torque tightening operation, thereby making it possible to achieve a high efficiency of screw tightening operation.

Further, the clutch adapted to be acted upon by the aforesaid torque cut-off mechanism achieves a high-precision tightening torque and fully meets the recent increasing demand for torque control.

Further, since the electrically powered torque-controlled tool of the embodiments is designed to push-start the electric motor and stop it immediately after fixed torque tightening, as described above, the tool is prevented from causing occupational diseases, such as tenosynovitis, which has been recently at issue; and since the electric motor may be rotated only when necessary, the noise is reduced and, more than anything else, the life of the electric motor, especially the brushes can be prolonged.

We claim:

1. A powered torque-controlled tool comprising:
a motor which is a drive source;
a control means for starting and stopping said motor;
a clutch installed between said motor and a bit holder so as to permit interruption and continuation of the transmission of rotation between the both, said clutch having a driving and a driven element;
a torque cut-off mechanism adapted to act on said clutch when the torque on the bit holder reaches a preset torque value to thereby cut off the driving force from the motor to the bit holder, said torque cut-off mechanism comprising a drive shaft receiving the driving force of said motor and having cam surfaces, a driving member having said driving element of said clutch at one end portion thereof and axially tapered grooves at portions of its inner periphery facing said cam surfaces of said drive shaft, said driving member being rotatable and axially slidable relative to said drive shaft, balls disposed between said cam surfaces of said drive shaft and said grooves of said driving member and continuously drivingly coupling said driving member to said drive shaft, said balls being movable radially in response to the force received from said cam surfaces of said drive shaft by rotation thereof and forcing axial movement of said driving member, and resilient means axially biasing said balls and said driving member into contact;
a lock mechanism for holding said clutch driven element in its disengaged state at the cut-off time; and
an operating means adapted to transmit the action of said torque cut-off mechanism to said control means, said clutch constituting the sole means for interrupting the transmission of rotation from said motor to said bit holder.

2. A powered torque-controlled tool as set forth in claim 1, wherein said torque cut-off mechanism has a torque adjusting means for changing the preset torque value.

3. In a powered torque-controlled tool having a casing, a motor mounted in said casing, a control means for starting and stopping said motor, a rotatable drive shaft coupled to said motor and supported by said casing in axially fixed relation, a bit holder rotatably supported by said casing and drive shaft for axial inward movement relative thereto in response to end thrust on the casing, means axially biasing the bit holder outwardly of the casing, and torque-responsive drive mechanism interposed between said drive shaft and bit holder, the improvement wherein said drive mechanism comprises:
a clutch having interengageable driving and driven elements;
means rotatably supporting said clutch driving element on said drive shaft for axial movement relative thereto;
torque-responsive means acting between said drive shaft and clutch driving element for continuously drivingly coupling said clutch driving element to said drive shaft and for moving said clutch driving element axially in response to the torque transmitted by said drive shaft, said torque-responsive means comprising a cam surface on said drive shaft, an axially tapered grooved surface on said clutch driving element, and a ball interposed between said surfaces and movable radially by said cam surface;

torque spring means for opposing axial movement of said clutch driving element by said torque-responsive means, said torque spring means axially biasing said clutch driving element into engagement with said ball;

means mounting said clutch driven element on the bit holder for rotation therewith and axial movement relative thereto, a reset spring normally urging said clutch driven element toward said clutch driving element to a normal position of disengagement therewith, said clutch driven element being movable into engagement with said clutch driving element in response to axially inward movement of said bit holder and said clutch driven element being movable axially outward relative to said bit holder in response to movement of said clutch driving element by said torque-responsive means;

lock mechanism movable into engagement with said clutch driven member in response to said axially outward movement thereof; and, an operating means for stopping said motor in response to movement of said lock mechanism, said clutch constituting the sole means for interrupting the transmission of rotation from said motor to said bit holder.

4. A powered torque-controlled tool as set forth in claim 3, wherein said cam surface is formed by a chord-like segment on said drive shaft.

5. A powered torque-controlled tool as set forth in claims 3 or 4, wherein said lock mechanism comprises a lock cam supported for slidable and coaxial movement by said bit holder, radially movable ball means carried by said bit holder, lock spring means normally urging said lock cam into engagement with said ball means, and a portion on said clutch driven element engageable by said ball means.

6. A powered torque-controlled tool according to claim 5, wherein said operating means includes operating rod engaging and positionable by said lock cam.

7. A powered torque-controlled tool according to claim 6 further including torque adjusting mechanism comprising pin means slidably carried by said casing for axial movement parallel to said bit holder, an adjusting nut carried by external threads on the casing and engageable with one of the ends of said pins, the opposite ends of said pins acting against said torque spring means.

* * * * *

UNITED STATES PATENT AND TRADEMARK OFFICE

CERTIFICATE OF CORRECTION

PATENT NO. : 4,265,320

DATED : May 5, 1981

INVENTOR(S) : TAMOTSU TANAKA ET AL

It is certified that error appears in the above—identified patent and that said Letters Patent is hereby corrected as shown below:

Title page, under "[75] Inventors:" "Hirakata" (first occurrence) should read -- Osaka --; "Katano" should read -- Osaka --; "Hirakata" (second occurrence) should read -- Osaka -- and "Habikino" should read -- Osaka --;

Col. 10, line 15, after "includes" insert -- an --.

Signed and Sealed this

*First* Day of *September 1981*

[SEAL]

*Attest:*

GERALD J. MOSSINGHOFF

*Attesting Officer* *Commissioner of Patents and Trademarks*